United States Patent Office.

H. STONEBRAKER, OF BALTIMORE, MARYLAND.

Letters Patent No. 62,298, dated February 19, 1867.

IMPROVED LINIMENT.

The Schedule referred to in these Letters Patent and making part of the same.

TO ALL WHOM IT MAY CONCERN:

Be it known that I, H. STONEBRAKER, of Baltimore, in the county of Baltimore, and in the State of Maryland, have invented certain new and useful Improvements in Liniment, and do hereby declare that the following is a full, clear, and exact description thereof.

My invention has for its object the cure of rheumatism, tetter or ringworm, corns, swellings, fresh or old wounds, bruises, sprains, sweeny, sore throat, pains in the back and limbs, spinal affections, and other diseases requiring an external application.

This liniment is composed of the following ingredients, and mixed in quantities to suit: To one and a half gallon alcohol, add two and a quarter pounds ammonia; three quarters gallon turpentine, ten ounces linseed oil; one-half pound oil origanum, five ounces oil succini; one ounce cayenne pepper, five ounces oil juniper; four ounces Barbadoes tar, one and a half ounce oil Seneca and one and a half pound Castile soap, dissolved in water.

The above to be well mixed, and used: for rheumatism, tetter, &c., rub the parts affected well night and morning; corns, apply the liniment to raw cotton, and bind on the corn for seven or eight nights, occasionally scraping the corn with a knife; swellings and sprains, take a tablespoonful with the hand and rub the parts affected two or three times a day; sore throat, pain in the back and limbs, rub well night and morning, and on going to bed apply the liniment on flannel and bind the parts affected.

Having thus fully described my invention, what I claim as new, and desire to secure by Letters Patent, is—

The within-described liniment, when mixed and used substantially as and for the purposes set forth.

In testimony that I claim the foregoing I have hereunto set my hand and seal this 1st day of December, 1866.

H. STONEBRAKER.

Witnesses:
  J. M. MASON,
  C. M. ALEXANDER.